United States Patent
Freund et al.

(10) Patent No.: US 6,718,781 B2
(45) Date of Patent: Apr. 13, 2004

(54) REFRIGERATION UNIT APPARATUS AND METHOD

(75) Inventors: Peter W. Freund, Bloomington, MN (US); Lars I. Sjoholm, Burnsville, MN (US)

(73) Assignee: Thermo King Corporation, Minneapolis, MN (US)

( * ) Notice: Subject to any disclaimer, the term of this patent is extended or adjusted under 35 U.S.C. 154(b) by 132 days.

(21) Appl. No.: 09/903,252

(22) Filed: Jul. 11, 2001

(65) Prior Publication Data

US 2003/0010046 A1 Jan. 16, 2003

(51) Int. Cl.$^7$ .............................. F25B 5/00; F25B 41/00
(52) U.S. Cl. ........................................ 62/199; 62/513
(58) Field of Search ........................ 62/198, 513, 199, 62/225, 222

(56) References Cited

U.S. PATENT DOCUMENTS

| | | | |
|---|---|---|---|
| 3,150,277 A | 9/1964 | Chubb et al. ................. 310/54 |
| 3,913,346 A | 10/1975 | Moody, Jr. et al. ........... 62/197 |
| 3,931,718 A | 1/1976 | Haselden ..................... 62/505 |
| 4,261,180 A | 4/1981 | Nozawa et al. ............... 62/202 |
| 4,419,866 A | 12/1983 | Howland .................... 62/228.4 |
| 4,523,435 A | 6/1985 | Lord ............................ 62/212 |
| 4,571,951 A | 2/1986 | Szymaszek ................... 62/212 |
| 4,589,060 A | 5/1986 | Zinsmeyer ................ 62/201 X |
| 4,663,725 A | 5/1987 | Truckenbrod et al. ...... 165/204 |
| 4,850,197 A | 7/1989 | Taylor et al. .................. 62/81 |
| 4,947,655 A | 8/1990 | Shaw .......................... 62/200 |
| 4,974,427 A | 12/1990 | Diab ............................ 62/505 |
| 5,095,712 A | 3/1992 | Narreau ....................... 62/113 |
| 5,174,123 A | 12/1992 | Erickson ...................... 62/113 |
| 5,228,301 A | 7/1993 | Sjoholm et al. ............... 62/84 |
| 5,400,609 A | 3/1995 | Sjoholm et al. ......... 62/196.4 X |
| 5,408,836 A | 4/1995 | Sjoholm et al. ......... 62/196.1 X |
| 5,410,889 A | 5/1995 | Sjoholm et al. ......... 62/196.2 X |
| 5,465,587 A | 11/1995 | Sjoholm et al. ......... 62/196.1 X |
| 5,477,695 A | 12/1995 | Sjoholm et al. ............... 62/84 |

(List continued on next page.)

Primary Examiner—William Wayner
(74) Attorney, Agent, or Firm—Michael Best & Friedrich LLP (57) ABSTRACT

A method for controlling at least one electronic expansion valve coupled to an economizer in a refrigeration system in order to dynamically control the refrigeration system operating conditions and in order to accommodate more than one set of operating conditions. The system can also be used to control the capacity of the system. More specifically, the method can include determining the required capacity of the system and adjusting the flow of refrigerant through the electronic expansion valve to adjust the actual capacity of the system toward the required capacity of the system. In another aspect of the invention, the system is operated to maintain the power of the system below a threshold value (e.g., below a max rated horsepower). This method includes determining the power required to operate the compressor based on the measurement of system parameters; comparing the power required to a threshold value; and adjusting the flow of refrigerant through the electronic expansion valve in order to keep the power required below the threshold value. In yet another aspect of the invention, the system is operated in order to prevent overheating of the compressor. More specifically, the flow of refrigerant from the heat exchanger to the compressor can be adjusted so that some amount of liquid refrigerant is provided to quench the compressor.

22 Claims, 6 Drawing Sheets

U.S. PATENT DOCUMENTS

| | | |
|---|---|---|
| 5,582,022 A | 12/1996 | Heinrichs et al. .............. 62/175 |
| 5,596,878 A | 1/1997 | Hanson et al. ................. 62/160 |
| 5,598,718 A | 2/1997 | Freund et al. .............. 62/238.6 |
| 5,768,901 A | 6/1998 | Dormer et al. ................ 62/175 |
| 5,806,324 A | 9/1998 | Shaw ........................ 62/197 X |
| 5,816,055 A | 10/1998 | Ohman .................. 62/196.3 X |
| 6,058,729 A | 5/2000 | Lifson et al. .......... 62/196.1 X |
| 6,095,427 A | 8/2000 | Hoium et al. .............. 62/157 X |
| 6,112,534 A | 9/2000 | Taras et al. ............. 62/220.1 X |
| 6,138,467 A | 10/2000 | Lifson et al. .......... 62/196.3 X |
| 6,141,981 A | 11/2000 | Reason et al. ............ 62/223 X |
| 6,148,628 A | 11/2000 | Reason et al. ............ 62/211 X |
| 6,170,277 B1 | 1/2001 | Porter et al. ................ 62/228.3 |
| 6,446,450 B1 * | 9/2002 | Pressler .................... 62/197 X |
| 6,474,087 B1 * | 11/2002 | Lifson ......................... 62/199 |

* cited by examiner

REFRIGERATION UNIT APPARATUS AND METHOD

BACKGROUND OF THE INVENTION

The invention relates in general to the operation of a refrigeration system, and more specifically to the control of at least one electronic expansion valve coupled to an economizer in a refrigeration system.

Refrigeration systems generally include a refrigerant circuit including a compressor, a condenser, a main throttling device, and an evaporator. Vapor refrigerant is delivered to the compressor where the temperature and pressure of the vapor refrigerant is increased. The compressed vapor refrigerant is then delivered to the condenser where heat is removed from the vapor refrigerant in order to condense the vapor refrigerant into liquid form. The liquid refrigerant is then delivered from the condenser to a main throttling device, such as a mechanical thermostatic expansion valve. The main throttling device restricts the flow of the liquid refrigerant by forcing the liquid through a small orifice in order to decrease the pressure of the liquid and therefore decrease the boiling point of the liquid. Upon exiting the main throttling device, the liquid refrigerant is in the form of liquid refrigerant droplets. The liquid refrigerant droplets are delivered from the main throttling device to the evaporator, which is located within or in thermal communication with the space to be conditioned by the refrigeration system. As air passes over the evaporator, the liquid refrigerant droplets absorb heat from the air in order to cool the air. The cooled air is circulated through the conditioned space to cool the masses within the conditioned space. Once the liquid refrigerant droplets have absorbed sufficient heat, the liquid refrigerant droplets vaporize. To complete the refrigeration cycle, the vapor refrigerant is delivered from the evaporator back to the compressor.

An additional heat exchanger in the form of an economizer may be added to the refrigeration system in order to enhance the efficiency of the cycle. The economizer is often coupled between the condenser and the main throttling device. Specifically, the economizer is coupled to the condenser by an economizer input line having a first branch and a second branch. The first branch delivers refrigerant through the economizer to the main throttling device. The second branch delivers refrigerant through a secondary throttling device, through an economizer chamber within the economizer, and back to the compressor. In an economizer system, the refrigerant flowing to the main throttling device is routed through the economizer to be sub-cooled, while some refrigerant is drawn off through the second branch of the economizer input line to a secondary throttling device. The drawn-off refrigerant passes through the secondary throttling device, where it is cooled by the throttling process, and into the economizer chamber. Once in the economizer chamber, the drawn-off refrigerant is in a heat transfer relationship with the refrigerant flowing through the first branch of the economizer input line to the main throttling device. The drawn-off refrigerant absorbs heat from the refrigerant flowing through the first branch to the main throttling device. Thus, the refrigerant flowing through the first branch is sub-cooled. Liquid refrigerant is sub-cooled when the temperature of the liquid is lower than the vaporization temperature for the refrigerant at a given pressure. The drawn-off refrigerant absorbs heat until it vaporizes.

Before the drawn-off refrigerant is directed back to the compressor, the vaporized refrigerant has generally reached a superheat level. The refrigerant reaches a superheat level when all of the refrigerant has vaporized and the temperature of the refrigerant is above the vaporization temperature for the refrigerant at a given pressure. The refrigerant at the superheated level is then directed back to the compressor.

The operating conditions of the refrigeration system are controlled, in part, by the operation of the economizer. The economizer is controlled by the secondary throttling device. Generally, the main and secondary throttling devices are mechanical thermostatic expansion valves (TXV), which operate based on the temperature and pressure of the refrigerant passing through the valve.

SUMMARY OF THE INVENTION

The use of TXVs for the main and secondary throttling devices has several limitations. First, TXVs cannot be dynamically adjusted to control the operating conditions of the refrigeration system. TXVs are initially designed to optimize the operating conditions of the refrigeration system, but the TXVs cannot be dynamically adjusted to optimize the operating conditions at all times.

Moreover, TXVs can only accommodate one set of operating conditions. A TXV in the economizer cycle is generally designed to maintain one set of primary operating conditions. However, extraordinary or secondary operating conditions may occur, which may demand the primary operating conditions to be overridden. A TXV cannot accommodate secondary operating conditions that may be desired to periodically override the primary operating conditions.

Accordingly, the invention provides a method and apparatus for controlling at least one electronic expansion valve coupled to an economizer in a refrigeration system in order to dynamically control the refrigeration system operating conditions and in order to accommodate more than one set of operating conditions. The refrigeration system generally includes a compressor, a condenser coupled to the compressor, a heat exchanger coupled to both the condenser and the compressor, an evaporator coupled to both the heat exchanger and the compressor, and an electronic expansion valve, an input of the valve coupled between the condenser and the heat exchanger, an output of the valve coupled to the compressor.

The above-described structure is normally operated under a set of primary operating conditions. One condition is that the state of the refrigerant flowing from the heat exchanger to the compressor is maintained above superheat temperature. More specifically, the pressure between the heat exchanger and the compressor is sensed. The sensed pressure is converted into a saturation temperature value. The temperature between the heat exchanger and the compressor is sensed. The saturated suction temperature value is compared to the sensed temperature. The flow of refrigerant through the EXV is adjusted until the sensed temperature is greater than the saturated suction temperature value.

The above-described structure can also be used to control the capacity of the system. More specifically, the method can include determining the required capacity of the system and adjusting the flow of refrigerant through the electronic expansion valve to adjust the actual capacity of the system toward the required capacity of the system. For example, if the required capacity is less than the actual capacity, then the flow of refrigerant through the electronic expansion valve can be decreased. Likewise, if the required capacity is greater than the actual capacity, then the flow of refrigerant through the electronic expansion valve can be increased. In either event the method may require that the primary set of operating conditions be overridden.

In another aspect of the invention, the system is operated to maintain the power of the system below a threshold value (e.g., below a max rated horsepower). This method includes determining the power required to operate the compressor based on the measurement of system parameters; comparing the power required to a threshold value; and adjusting the flow of refrigerant through the electronic expansion valve in order to keep the power required below the threshold value. There are many different ways to determine the required power (e.g., by sensing the pressure between the heat exchanger and the compressor, the pressure between the evaporator and the compressor, the pressure between the compressor and the condenser, and the flow rate of refrigerant). In this embodiment, if the horsepower required to operate the compressor is less than the threshold value, then there is no need to adjust the flow of refrigerant through the electronic expansion valve. However, if the power required to operate the compressor is greater than the threshold value, then the flow of refrigerant through the electronic expansion valve can be decreased to avoid operating the system above its rated power limit. In order to do this, the primary operating conditions may need to be overridden.

In yet another aspect of the invention, the system is operated in order to prevent overheating of the compressor. More specifically, the flow of refrigerant from the heat exchanger to the compressor can be adjusted so that some amount of liquid refrigerant is provided to quench the compressor. The method includes measuring a system parameter corresponding with the temperature of the compressor; comparing the measured system parameter to a threshold value; and adjusting the flow of refrigerant into the compressor by adjusting the flow of refrigerant through the electronic expansion valve in order to keep the system parameter below the threshold value. The system parameter can be any parameter that corresponds with the temperature of the compressor (e.g., the temperature of the compressor, the temperature of refrigerant flowing from the compressor, etc.). In practice, if the system parameter exceeds the threshold value, the flow of refrigerant through the electronic expansion valve can be increased in order to provide a volume of liquid refrigerant to quench the compressor. In order to do this, the primary operating conditions may need to be overridden.

Other features and advantages of the invention will become apparent to those of ordinary skill in the art upon review of the following description, claims, and drawings.

Before one embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 1:
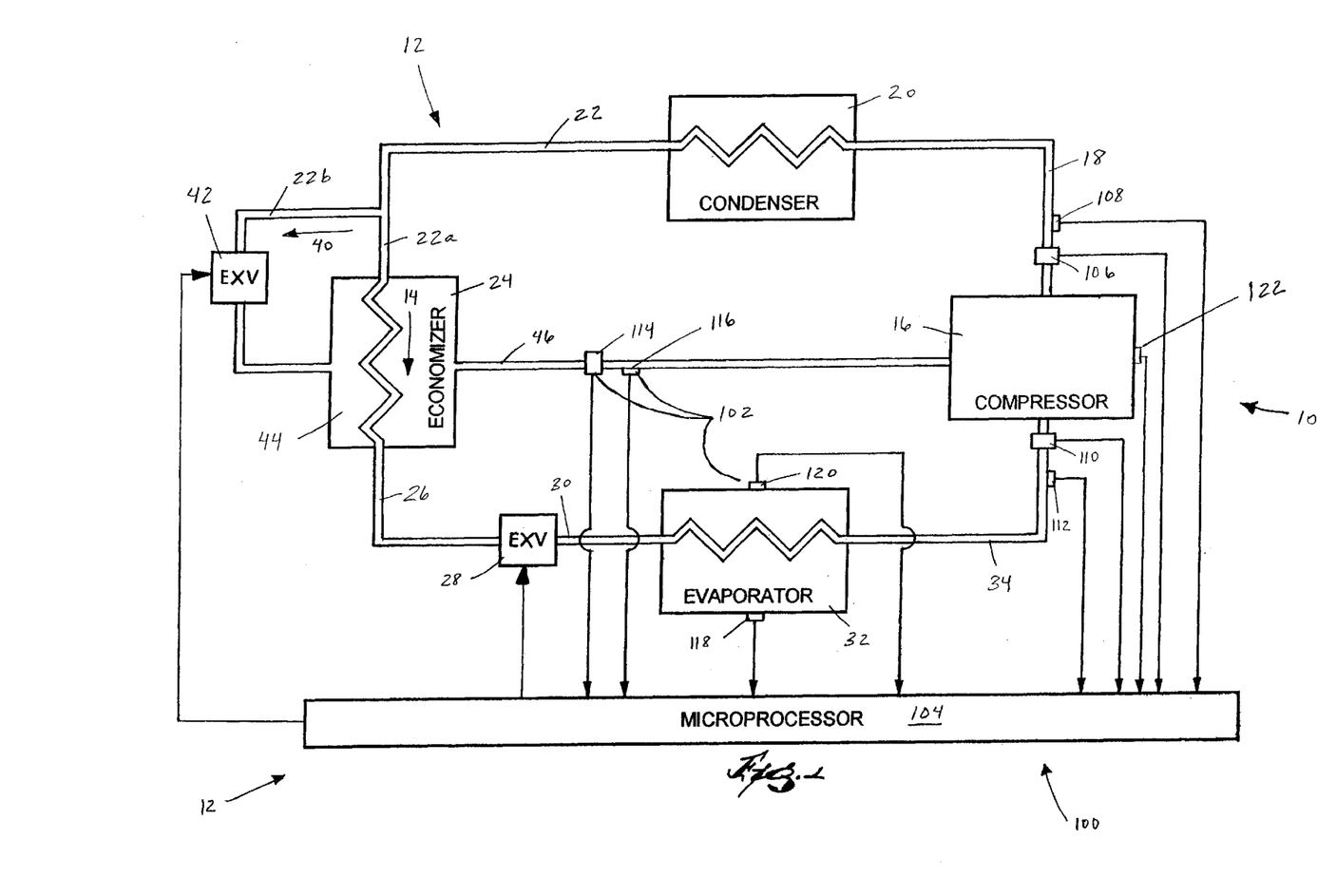
FIG. 1 is a schematic representation of a refrigeration system embodying the invention.

FIG. 1 illustrates a refrigeration system 10 embodying the invention. The refrigeration system 10 includes a refrigerant circuit 12 and a microprocessor circuit 100. The refrigerant circuit 12 generally defines the flow of fluid refrigerant through the refrigeration system 10. The refrigerant circuit 12 includes a first fluid path 14 and a second fluid path 40.

The first fluid path 14 is defined by a compressor 16, a discharge line 18, a condenser 20, an economizer input line 22, an economizer 24, a first economizer output line 26, a main electronic expansion valve (EXV) 28, an evaporator input line 30, an evaporator 32, and a suction line 34. The compressor 16 is fluidly coupled to the condenser 20 by the discharge line 18. The condenser 20 is fluidly coupled to the economizer 24 by the economizer input line 22. The economizer input line 22 includes a first branch 22a and a second branch 22b. The first branch 22a defines part of the first fluid path 14, while the second branch 22b defines part of the second fluid path 40, as will be described below. The economizer 24 is fluidly coupled to the main EXV 28 by the first economizer output line 26. The main EXV 28 is fluidly coupled to the evaporator 32 by the evaporator input line 30. To complete the first fluid path 14, the evaporator 32 is fluidly coupled to the compressor 16 by the suction line 34.

The second fluid path 40 is defined by some of the components of the first fluid path 14 and is also defined by some additional components. The second fluid path 40 passes through the compressor 16, the discharge line 18, the condenser 20, the economizer input line 22 (via the second branch 22b), a secondary EXV 42, an economizer chamber 44, and a second economizer output line 46. Similar to the first fluid path 14, in the second fluid path 40, the compressor 16 is fluidly coupled to the condenser 20 by discharge line 18. Also, the condenser 20 is coupled to the economizer 24 by economizer input line 22.

The second branch 22b of the economizer input line 22 is fluidly coupled to the secondary EXV 42. The secondary EXV 42 is coupled via the second branch 22b to the economizer chamber 44, which is positioned within the economizer 24. The refrigerant passing into the economizer chamber 44 via the second branch 22b is in a heat transfer relationship with the refrigerant passing through the economizer 24 via the first branch 22a. To complete the second fluid path 40, the economizer chamber 44 is fluidly coupled to the compressor 16 by the second economizer output line 46.

The refrigerant in its various states flows through the first fluid path 14 of the refrigerant circuit 12 as follows. Vaporized refrigerant is delivered to the compressor 16 by the suction line 34. The compressor 16 compresses the vaporized refrigerant by increasing its temperature and pressure. The compressed, vaporized refrigerant is then delivered to the condenser 20 by the discharge line 18. In a preferred embodiment of the invention, the compressor 16 is a screw-type compressor. However, the compressor 16 may be any appropriate type of compressor. Moreover, the refrigeration system 10 illustrated in FIG. 1 includes only a single compressor 16. However, more than one compressor may be included in the refrigeration system 10. If more than one compressor is included in the refrigeration system 10, the compressors may be arranged in a series configuration or in a parallel configuration.

The condenser 20 receives compressed, vaporized refrigerant from the compressor 16. The condenser 20 is a heat exchanger apparatus used to remove heat from the refrigerant in order to condense the vaporized refrigerant into liquid refrigerant. In the condenser 20, the compressed, vaporized refrigerant releases heat to the air in communication with the condenser 20 in order to cool the vaporized refrigerant. The cooling action of the condenser 20 causes the state of the refrigerant to change from vapor to liquid.

While in the first fluid path 14, the liquid refrigerant flows through the first branch 22a of economizer input line 22 to the economizer 24. As the refrigerant flows through the first branch 22a, the refrigerant is in a heat transfer relationship with the refrigerant in the economizer chamber 44. The refrigerant flowing through the first branch 22a releases heat to the refrigerant in the economizer chamber 44, thus sub-cooling the liquid refrigerant flowing through the first branch 22a. Liquid refrigerant is sub-cooled when the temperature of the liquid is lower than its saturation or vaporization temperature at a given pressure. In general, both the condenser 20 and the economizer 24 sub-cool the liquid refrigerant, but the economizer 24 sub-cools the refrigerant more than the condenser 20.

The sub-cooled liquid refrigerant is then delivered to the main EXV 28 by the first economizer output line 26. The main EXV 28 is a throttling device that restricts the flow of the liquid refrigerant by forcing the liquid refrigerant through a small orifice. Forcing the liquid refrigerant through a small orifice causes the pressure of the liquid refrigerant to decrease thereby lowering the boiling temperature of the refrigerant. Reducing the pressure on the liquid refrigerant lowers the boiling point of the refrigerant, making the refrigerant evaporate. As the liquid refrigerant passes through the small orifice of the main EXV 28, the liquid refrigerant forms into liquid droplets.

The liquid refrigerant droplets are delivered to the evaporator 32 by evaporator input line 30. The liquid refrigerant droplets delivered to the evaporator 32 absorb heat from warm air flowing into the evaporator 32. The evaporator 32 is located within or in thermal communication with the space being conditioned by the refrigeration system 10. Air is generally circulated between the conditioned space and the evaporator 32 by one or more evaporator fans (not shown). Generally, warmer air flows into the evaporator 32, the liquid refrigerant droplets absorb heat from the warmer air, and cooler air flows out of the evaporator 32. The cooler air flowing out of the evaporator 32 cools the masses in the conditioned space by absorbing heat from the masses. Once the cooler air flowing out of the evaporator 32 absorbs heat from the masses within the conditioned space, the warmer air is circulated back to the evaporator 32 by the evaporator fans to be cooled again.

The liquid refrigerant droplets vaporize once they have absorbed sufficient heat, i.e. once the liquid refrigerant droplets reach their saturation or vaporization temperature at a given pressure. The refrigerant, which has changed from liquid refrigerant droplets back to vaporized refrigerant, is then delivered by suction line 34 back to the compressor 16. The delivery of the vaporized refrigerant back to the compressor 16 completes the flow of refrigerant through the first fluid path 14.

The refrigerant in its various states flows through the second fluid path 40 of the refrigerant circuit 12 as follows. Vaporized refrigerant is delivered to the compressor 16 by the second economizer output line 46. Just as in the first fluid path 14, the compressor 16 compresses the vaporized refrigerant by increasing the temperature and pressure of the vaporized refrigerant. The compressed, vaporized refrigerant is then delivered to the condenser 20 by discharge line 18. In the condenser 20, the compressed, vaporized refrigerant releases heat to the air in communication with the condenser 20. The cooling action of the condenser 20 causes the state of the refrigerant to change from vapor to liquid. The liquid refrigerant exiting the condenser 20 is delivered to the economizer 24 by economizer input line 22.

Some of the liquid refrigerant exiting the condenser 20 may be drawn off and directed through the second branch 22b of the economizer input line 22. The amount of liquid refrigerant drawn off and directed through the second branch 22b is determined by the position of the secondary EXV 42, among other things. Similar to the main EXV 28, the secondary EXV 42 is a throttling device used to reduce the pressure and lower the boiling point the refrigerant. As the liquid refrigerant passes through the small orifice of the secondary EXV 42, the liquid refrigerant forms into liquid refrigerant droplets.

The liquid refrigerant droplets from the secondary EXV 42 pass into the economizer chamber 44, where the liquid refrigerant droplets are in a heat transfer relationship with the liquid refrigerant passing through the economizer 24 via the first branch 22a. The liquid refrigerant droplets absorb heat from the liquid refrigerant passing through the first branch 22a. The liquid refrigerant droplets vaporize once they have absorbed sufficient heat. The vaporization of the liquid refrigerant in the economizer compartment 44 further cools the liquid refrigerant passing through the first branch 22a. Thus, the liquid refrigerant passing through the first branch 22a of the economizer input line 22 is sub-cooled. Liquid refrigerant is sub-cooled when the temperature of the liquid refrigerant is lower than the saturation or vaporization temperature of the refrigerant at a given pressure.

Once all of the liquid refrigerant droplets in the economizer chamber 44 have vaporized, the vaporized refrigerant continues to absorb heat until the vaporized refrigerant is superheated. Refrigerant reaches a superheated level when the temperature of the refrigerant is above the vaporization or saturation temperature of the refrigerant at a given pressure. The vaporized refrigerant is then delivered to the compressor 16 via the second economizer output line 46. The delivery of the vaporized refrigerant back to the compressor 16 completes the flow of refrigerant through the second fluid path 40.

The microprocessor circuit 100 includes a plurality of sensors 102 coupled to the refrigerant circuit 12 and coupled to a microprocessor 104. The microprocessor circuit 100 also controls the main EXV 28 coupled to the microprocessor 104 and the secondary EXV 42 coupled to the microprocessor 104.

The plurality of sensors 102 includes a compressor discharge pressure ($P_D$) sensor 106, a compressor discharge temperature ($T_D$) sensor 108, a suction pressure ($P_S$) sensor 110, a suction temperature sensor ($T_S$) 112, an economizer pressure ($P_E$) sensor 114, an economizer temperature ($T_E$) sensor 116, an evaporator input temperature ($T_{air,in}$) sensor 118, an evaporator output temperature ($T_{air,out}$) sensor 120, and at least one sensor 122 coupled to the compressor 16. Each one of the plurality of sensors 102 is electrically coupled to an input to the microprocessor 104. Moreover, the main EXV 28 and the secondary EXV 42 are each coupled to an output of the microprocessor 104.

Figure 5:
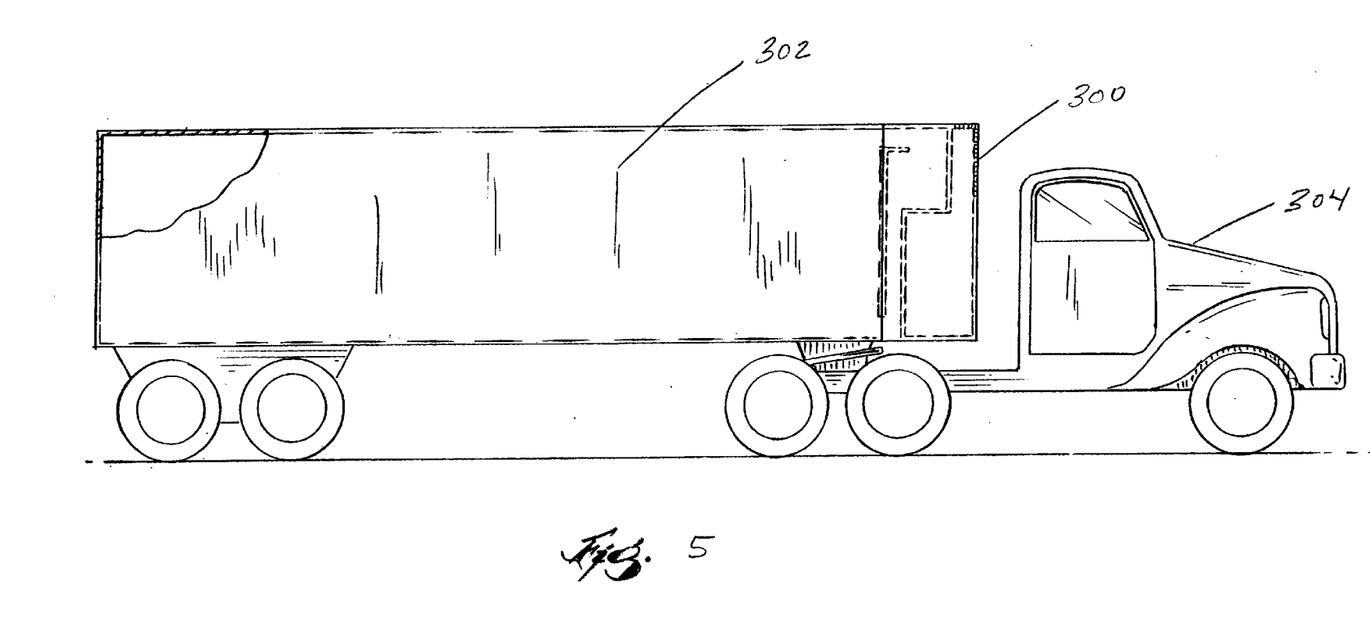
FIG. 5 illustrates the refrigeration system of FIG. 1 located within a refrigeration system-housing unit coupled to a transport container coupled to a tractor trailer.

In the preferred embodiment of the invention, as illustrated in FIG. 5, the above-described refrigeration system 10 is located within a refrigeration system housing unit 300 mounted on a transport container 302. The transport container 302 is coupled to a tractor trailer 304. Alternatively, the refrigeration system housing unit 300 may be coupled to any type of transport container unit coupled to any type of vehicle suitable for the transportation of goods, or to any type of vehicle (e.g. a truck or bus) that requires refrigeration.

Figure 2:
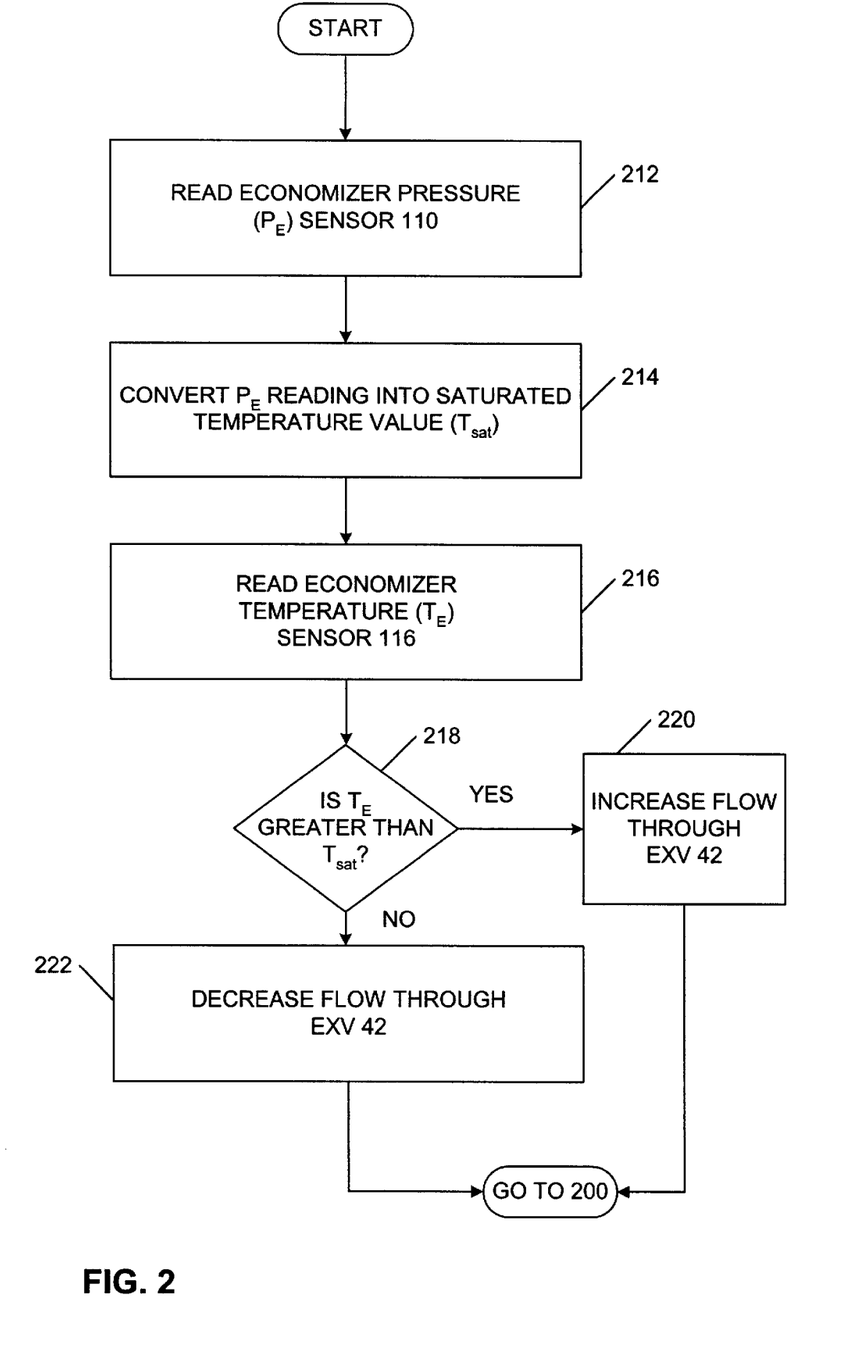
FIG. 2 illustrates a method of controlling the superheat level of the refrigerant in the refrigeration system of FIG. 1.

FIG. 2 illustrates a method of operating the refrigeration system 10 in order to maintain a set of primary operating conditions. Referring to FIG. 1, the purpose of the set of primary operating conditions is to ensure that the superheat level of the refrigerant flowing from the economizer 24 to the compressor 16 is maintained, while enhancing the capacity of the refrigeration system 10.

Referring to FIGS. 1 and 2, the microprocessor 104 reads 212 the economizer pressure ($P_E$) sensor 114. The microprocessor 104 determines 214 a saturated temperature value ($T_{sat}$) from the $P_E$ value. $T_{sat}$ is determined from the $P_E$ value by consulting a thermodynamic properties look-up table for the particular type of refrigerant being used in the refrigeration system 10. The thermodynamic properties look-up table is provided by the refrigerant manufacturer. A suitable type of refrigerant for this system is R404A refrigerant, which is manufactured by several companies, including E. I. duPont de Nemours and Company, AlliedSignal, Inc., and Elf Atochem, Inc.

Next, the microprocessor 104 reads 216 the economizer temperature ($T_E$) sensor 116. The microprocessor 104 then determines 218 whether $T_E$ is greater than $T_{sat}$. If $T_E$ is greater than $T_{sat}$, the refrigerant being delivered from the economizer 24 to the compressor 16 is superheated. Thus, the refrigeration system is operating in a manner that ensures that liquid refrigerant will not be delivered from the economizer 24 through the second economizer output line 46 to the compressor 16. As long as liquid is not currently being delivered to the compressor 16, the flow of refrigerant through the secondary EXV 42 can be increased incrementally in order to increase the efficiency, and therefore the capacity, of the system. Accordingly, the microprocessor 104 sends a signal to the secondary EXV 42 to increase 220 the flow of refrigerant through the secondary EXV 42. Once the microprocessor 104 sends the signal to increase the flow of refrigerant through the secondary EXV 42, the microprocessor 104 begins the sequence again by performing act 200.

If $T_E$ is less than $T_{sat}$, the refrigerant being delivered from the economizer 24 to the compressor 16 is not superheated. In order to ensure that the superheat level of the refrigerant is maintained, the flow of refrigerant through the secondary EXV 42 can be decreased. Decreasing the flow through the secondary EXV 42 allows the refrigerant to absorb more heat while the refrigerant is in a heat exchange relationship with the refrigerant flowing through the first branch 22a of the economizer input line 22 to the main EXV 28. The refrigerant absorbs more heat to ensure that all of the liquid refrigerant is vaporized. Decreasing the flow through the secondary EXV 42 also decreases the pressure of the refrigerant being delivered back to the compressor 16. In order to perform this step, the microprocessor 104 sends a signal to the secondary EXV 42 to decrease 222 the flow through the secondary EXV 42. Once the microprocessor 104 sends the signal to decrease the flow through the secondary EXV 42, the microprocessor 104 begins the sequence again by performing act 200.

Typically, the capacity of a standard refrigeration system is controlled by either adjusting the speed of the compressor or by adjusting the position of the primary expansion valve (e.g., main EXV 28). In one aspect of the present invention, the capacity of the system is controlled by adjusting the position of the secondary EXV 42. For example, if it is desired to reduce the capacity of the system, the secondary EXV 42 can be adjusted to a more closed position, thereby reducing the amount of refrigerant flowing through the economizer, which results in a reduction of the capacity of the system. Similarly, if there is a desire to increase the capacity of the system, the amount of refrigerant flowing through the secondary EXV 42 can be increased, thereby increasing the flow of refrigerant through the economizer, which increases the capacity of the system. It may be desirable to maintain feed back control on the system to ensure that the temperature of the refrigerant in the economizer output line 46 stays above the saturated temperature value for the given pressure to prevent delivery of liquid refrigerant to the compressor.

Figure 3:
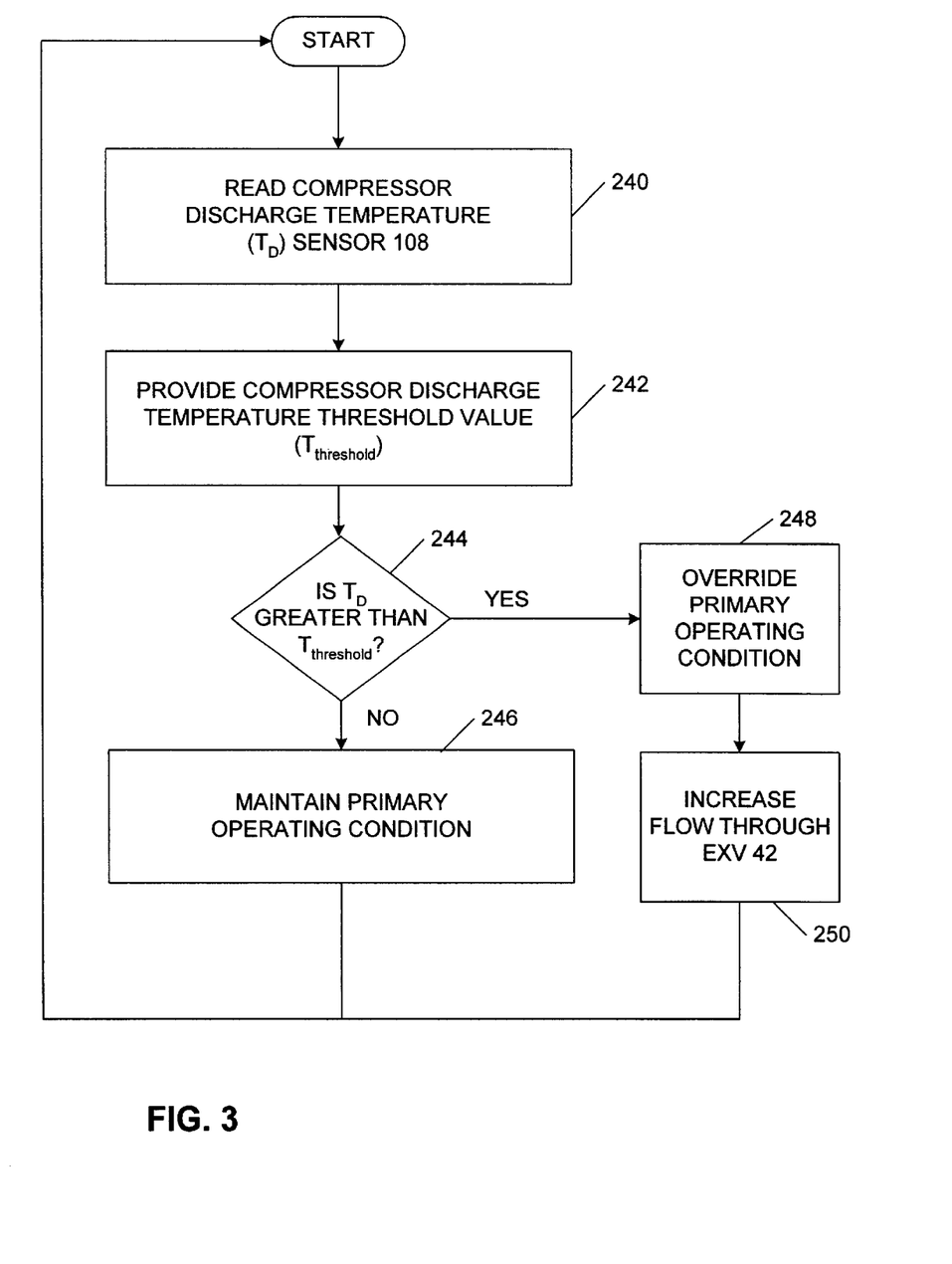
FIG. 3 illustrates a method of quenching the compressor of the refrigeration system of FIG. 1.

FIG. 3 illustrates another method of operating the refrigeration system 10 embodying the invention. While the method shown in FIG. 2 illustrates the operation of the refrigeration system 10 in order to maintain a set of primary operating conditions, FIG. 3 illustrates the operation of the refrigeration system 10 in order to maintain a first set of secondary operating conditions. Referring to FIG. 1, the purpose of the first set of secondary operating conditions is to quench the compressor 16 with liquid refrigerant if the compressor 16 overheats. Referring to FIGS. 1 and 3, the microprocessor 104 reads 240 the compressor discharge temperature ($T_D$) sensor 108. The compressor discharge temperature ($T_D$) sensor 108 may be physically located between the compressor 16 and the condenser 20 or on the compressor 16 itself. A compressor discharge temperature threshold value ($T_{threshold}$) is provided 242 to the microprocessor 104. The $T_{threshold}$ value is determined by the manufacturer of the particular compressor 16 being used in the refrigeration system 10. A suitable compressor 16 for use in the refrigeration system 10 is a Thermo King Corporation double-screw compressor with a $T_{threshold}$ value of approximately 310° F. The value for $T_{threshold}$ may be stored in a memory location accessible by the microprocessor 104.

The microprocessor 104 determines 244 whether $T_D$ is greater than $T_{threshold}$. If $T_D$ is not greater than $T_{threshold}$, the compressor 16 is operating within its temperature range, i.e. the compressor is not overheating. Accordingly, the microprocessor 104 sends a signal to the secondary EXV 42 to maintain 246 the primary operating conditions of the refrigeration system 10 by maintaining the current flow of refrigerant through the secondary EXV 42. Once the microprocessor 104 sends the signal to maintain 246 the primary operating conditions, the microprocessor 104 begins the sequence again by performing act 240. However, if $T_D$ is greater than $T_{threshold}$, the compressor 16 may be overheating. The compressor 16 can be quenched by providing a combination of vapor and liquid refrigerant to the compressor 16 through the second economizer output line 46. The refrigerant boils off of the compressor 16 in order to cool the compressor 16 to within its temperature operating range. In order to quench the compressor 16, the primary operating conditions of the refrigeration system must first be overridden 248, i.e. the flow of refrigerant to the compressor 16 must be increased even though the superheat level of the refrigerant flowing through the second economizer output line 46 will not be maintained while the compressor 16 is being quenched. Once the primary operating conditions are overridden 248, the microprocessor 104 sends a signal to the secondary EXV 42 to increase 250 the flow of refrigerant through the secondary EXV 42. Once the microprocessor 104 sends the signal to increase 250 the flow of refrigerant through the secondary EXV 42, the microprocessor 104 begins the sequence again by performing act 240. When $T_D$ is returned to a level less than $T_{threshold}$, the microprocessor 104 can return to the primary operating conditions.

Figure 4A:
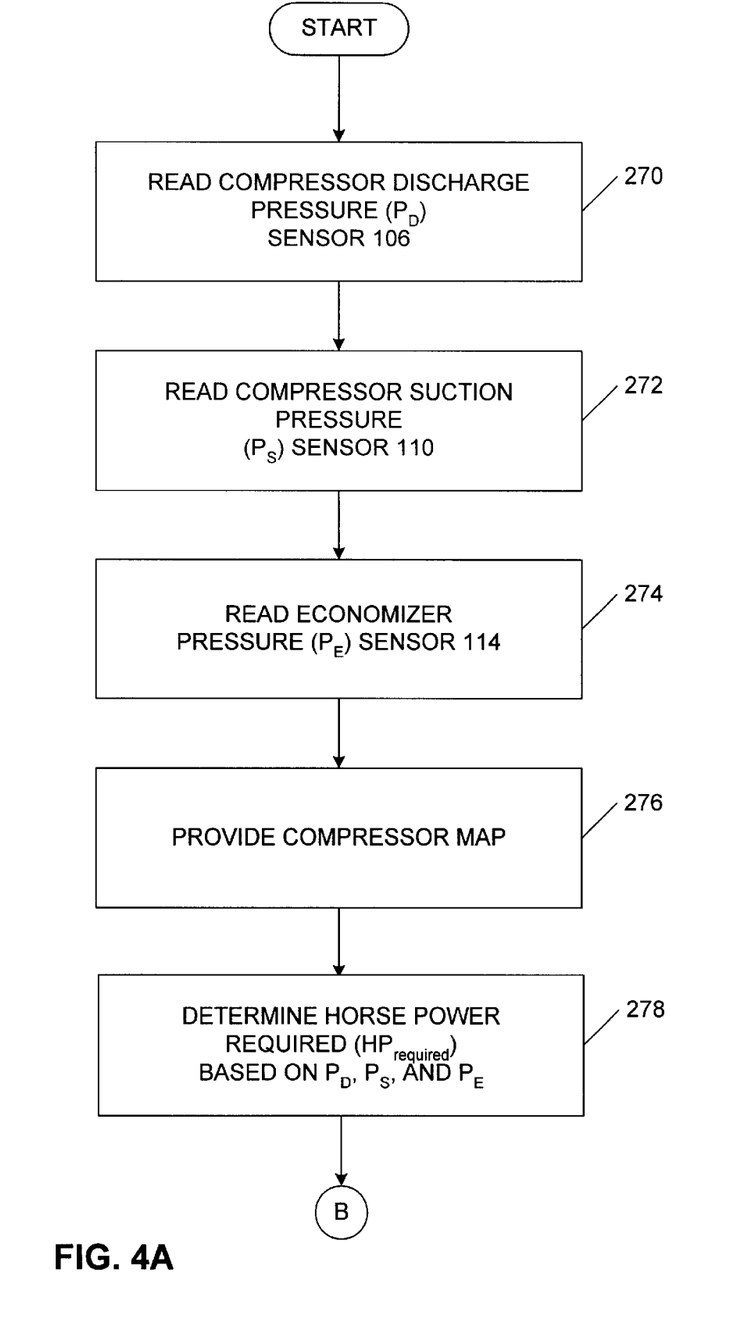
FIGS. 4A and 4B illustrate a method of controlling the horsepower of the engine of the refrigeration system of FIG. 1.
Figure 4B:
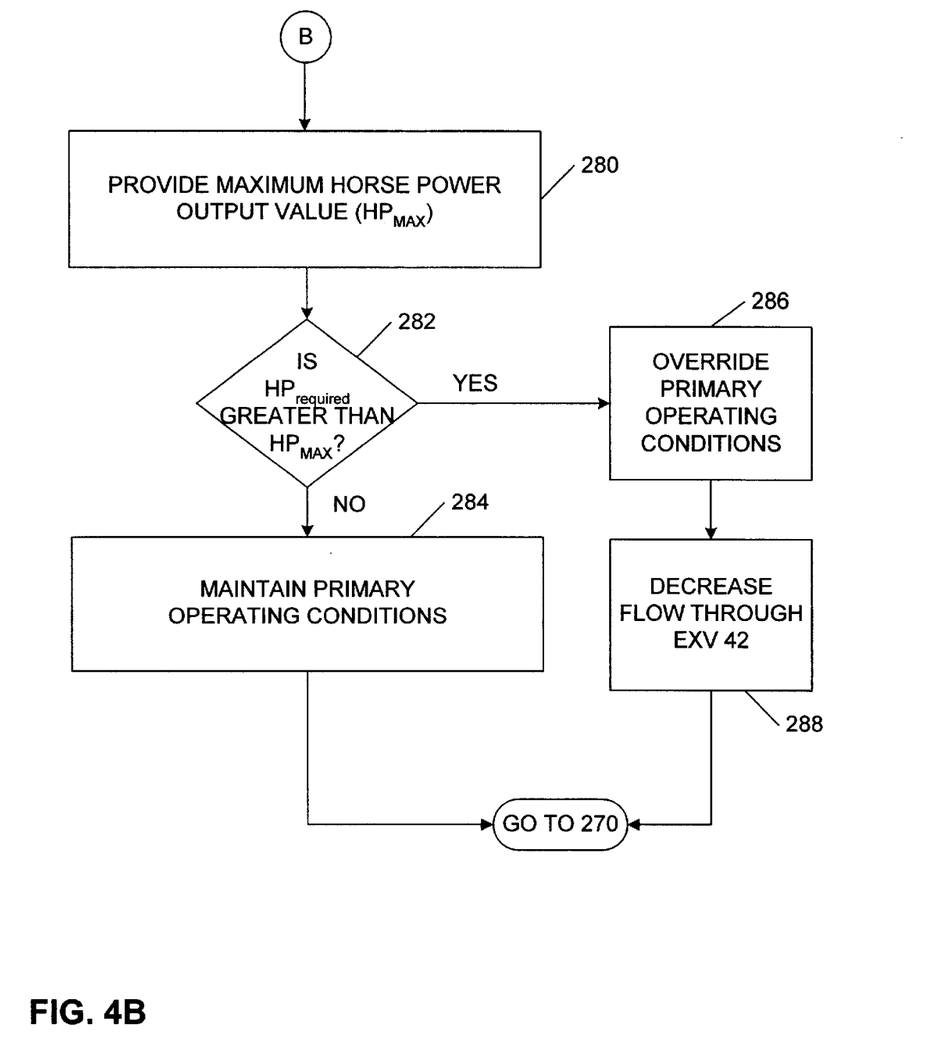

FIGS. 4A and 4B illustrate still another method of operating the refrigeration system 10 embodying the invention. FIGS. 4A and 4B illustrate the operation of the refrigeration system 10 in order to maintain a second set of secondary operating conditions. The purpose of the second set of secondary operating conditions is to prevent exceeding the horsepower output limit of the engine (not shown) that powers the compressor 16. Referring to FIGS. 1 and 4A, the microprocessor 104 reads 270 the compressor discharge pressure ($P_D$) sensor 106. The microprocessor 104 also reads 272 the compressor suction pressure ($P_S$) sensor 110. Finally, the microprocessor 104 reads 274 the economizer pressure ($P_E$) sensor 114.

A compressor map is provided 276 to the microprocessor 104. The compressor map may be stored in memory locations accessible by the microprocessor 104. Using the values for $P_D$, $P_S$, and $P_E$, the microprocessor 104 accesses the compressor map and determines 278 the horsepower required ($HP_{required}$) by the compressor 16 for the current sensed pressures, the current compressor speed, and the current mass flow of refrigerant through the refrigeration system 10. In order to determine the current compressor speed and the current mass flow of refrigerant, the microprocessor 104 reads at least one sensor 122 coupled to the compressor 16. It should be appreciated that there are other ways to determine the required power of the system, all of which fall within the scope of the present invention.

Referring to FIG. 4B, an upper power limit in the form of a maximum horsepower output value ($HP_{max}$) is provided 280 to the microprocessor 104. The $HP_{max}$ value is based on the maximum horsepower available from the compressor engine or prime mover (not shown). The $HP_{max}$ value for the compressor engine is provided by the manufacturer of the particular compressor engine and may be stored in memory accessible by the microprocessor 104. The microprocessor 104 determines 282 whether $HP_{required}$ is greater than $HP_{max}$. If $HP_{required}$ is not greater than $HP_{max}$, enough horsepower is available from the engine powering the compressor 16 for the current mass flow of refrigerant through the refrigeration system 10. Accordingly, the microprocessor 104 sends a signal to the secondary EXV 42 to maintain 284 the primary operating conditions by maintaining the current mass flow through the secondary EXV 42. Once the microprocessor 104 sends the signal to maintain 284 the primary operating conditions, the microprocessor 104 begins the sequence again by performing act 270.

However, if $HP_{required}$ is greater than $HP_{max}$, the engine powering the compressor 16 will not be able to provide enough horsepower to the compressor 16 for the current flow of refrigerant through the refrigeration system 10. In order to decrease the flow of refrigerant, the primary operating conditions must be overridden 286 and the flow through the secondary EXV 42 must be decreased 288. Once the primary operating conditions are overridden 286, the microprocessor 104 sends a signal to the secondary EXV 42 to decrease 288 the flow through the secondary EXV 42. Once the microprocessor 104 sends the signal to decrease 288 the flow of refrigerant through the secondary EXV 42, the microprocessor begins the sequence again by performing act 270.

Various features and advantages of the invention are set forth in the following claims.

What is claimed:

1. A method of controlling a refrigeration system, the refrigeration system including a compressor, a condenser coupled to the compressor, a heat exchanger coupled to both the condenser and the compressor, an evaporator coupled to both the heat exchanger and the compressor, and an electronic expansion valve, wherein an input of the valve is coupled between the condenser and the heat exchanger, and an output of the valve is coupled to the compressor, the method comprising:

determining the required capacity of the system; and adjusting the flow of refrigerant through the electronic expansion valve to adjust the actual capacity of the system toward the required capacity of the system.

2. The method of claim 1 wherein adjusting the flow of refrigerant through the electronic expansion valve includes decreasing the flow of refrigerant if the required capacity is less than the actual capacity.

3. The method of claim 1 wherein adjusting the flow of refrigerant through the electronic expansion valve includes increasing the flow of refrigerant if the required capacity is greater than the actual capacity.

4. The method of claim 3 further comprising overriding the set of primary operating conditions of the refrigeration system.

5. A method of controlling a refrigeration system, the refrigeration system including a compressor, a condenser coupled to the compressor, a heat exchanger coupled to both the condenser and the compressor, an evaporator coupled to both the heat exchanger and the compressor, and an electronic expansion valve, wherein an input of the valve is coupled between the condenser and the heat exchanger, and an output of the valve is coupled to the compressor, the method comprising:

determining the power required to operate the compressor based on the measurement of system parameters;

comparing the power required to a threshold value; and adjusting the flow of refrigerant through the electronic expansion valve in order to keep the power required below the threshold value.

6. The method of claim 5, wherein determining includes sensing the following system parameters: the pressure between the heat exchanger and the compressor, the pressure between the evaporator and the compressor, and the pressure between the compressor and the condenser.

7. The method of claim 5 wherein adjusting the flow of refrigerant includes maintaining the flow of refrigerant through the electronic expansion valve if the horsepower required to operate the compressor is less than the threshold value.

8. The method of claim 5 wherein adjusting the flow includes decreasing the flow of refrigerant through the electronic expansion valve if the power required to operate the compressor is greater than the threshold value.

9. The method of claim 8 wherein decreasing the flow of includes overriding the primary operating conditions of the refrigeration system in order to decrease the power required to operate the compressor to below the threshold value.

10. The method of claim 9 wherein overriding the primary operating conditions of the refrigeration system includes overriding the maintaining of the temperature of the refrigerant flowing from the heat exchanger to the compressor at a superheat level.

11. A refrigeration system comprising:

a refrigerant circuit including a compressor, a condenser coupled to the compressor, a heat exchanger coupled to the condenser and the compressor, and an evaporator coupled to the heat exchanger and the compressor;

an electronic expansion valve, an input of the valve coupled between the condenser and the heat exchanger, an output of the valve coupled to the compressor;

a first sensor and a second sensor positioned between the compressor and the condenser, the first sensor sensing temperature and the second sensor sensing pressure; and a microprocessor coupled to the valve and to the first and second sensors and programmed to control the flow of refrigerant through the valve.

12. The refrigeration system of claim 11, wherein the heat exchanger is an economizer.

13. The refrigeration system of claim 11, wherein:

the heat exchanger is coupled to the condenser by a heat exchanger input line;

the heat exchanger input line includes a first branch and a second branch;

the first branch of the heat exchanger input line directs refrigerant through the heat exchanger to the evaporator;

the second branch of the heat exchanger input line directs refrigerant through the electronic expansion valve into a heat exchanger chamber;

the heat exchanger chamber places refrigerant flowing through the second branch of the heat exchanger input line in thermal communication with refrigerant flowing through the first branch of the heat exchanger input line; and the heat exchanger chamber is coupled to the compressor.

14. The refrigeration system of claim 11, further comprising a third sensor and a fourth sensor positioned between the evaporator and the compressor, the third sensor sensing temperature and the fourth sensor sensing pressure.

15. The refrigeration system of claim 11, further comprising a third sensor and a fourth sensor positioned on the evaporator, the third and fourth sensors sensing temperature.

16. The refrigeration system of claim 11, further comprising a second electronic expansion valve coupled between the heat exchanger and the evaporator.

17. A refrigeration system comprising:

a first fluid path serially including a compressor, a discharge line, a condenser, a heat exchanger input line, a heat exchanger, a first heat exchanger output line, a throttling device, an evaporator, and a suction line;

a second fluid path serially including the compressor, the discharge line, the condenser, the heat exchanger input line, an electronic expansion valve, a heat exchanger chamber, and a second heat exchanger output line;

a first sensor and second sensor coupled to the discharge line, the first sensor sensing temperature and the second sensor sensing pressure; and a microprocessor coupled to the first and second sensors and the electronic expansion valve and programmed to control the flow of refrigerant fluid through the second fluid path.

18. The refrigeration system of claim 17, wherein the heat exchanger is an economizer.

19. The refrigeration system of claim 17, wherein:

the heat exchanger input line includes a first branch and a second branch;

the first branch of the heat exchanger input line directs refrigerant through the heat exchanger to the first heat exchanger output line and the throttling device;

the second branch of the heat exchanger input line directs refrigerant through the electronic expansion valve to the heat exchanger chamber;

the heat exchanger chamber places refrigerant flowing through the second branch of the heat exchanger input line in thermal communication with refrigerant flowing through the first branch of the heat exchanger input line; and the heat exchanger chamber is coupled to the compressor by the second heat exchanger output line.

20. The refrigeration system of claim 17, further comprising a third sensor and a fourth sensor coupled to the suction line, the third sensor sensing temperature and the fourth sensor sensing pressure.

21. The refrigeration system of claim 17, further comprising a third sensor and a fourth sensor coupled to the evaporator, the third and fourth sensors sensing temperature.

22. The refrigeration system of claim 17, wherein the throttling device is a second electronic expansion valve.

* * * * *